Figure 1:
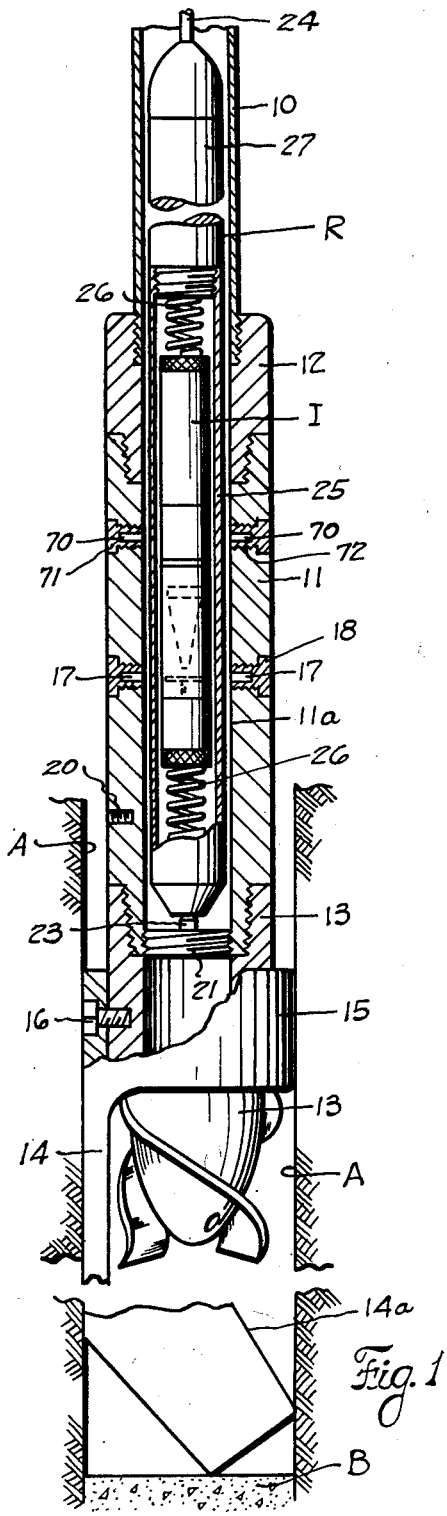

March 13, 1951     C. A. BROKAW ET AL     2,544,979
APPARATUS FOR ORIENTING TOOLS IN WELL BORES
Filed Oct. 20, 1947     2 Sheets-Sheet 1

Inventors
Charles A. Brokaw
William G. James

By Joe E. Edwards
Attorney

March 13, 1951     C. A. BROKAW ET AL     2,544,979
APPARATUS FOR ORIENTING TOOLS IN WELL BORES Filed Oct. 20, 1947     2 Sheets-Sheet 2

Inventors
Charles A. Brokaw
William G. James

By Joel E. Edwards
Attorney

Patented Mar. 13, 1951

2,544,979

UNITED STATES PATENT OFFICE 2,544,979

APPARATUS FOR ORIENTING TOOLS IN WELL BORES

Charles A. Brokaw, Dallas, and William G. James, Houston, Tex., assignors to Eastman Oil Well Survey Company, Denver, Colo., a corporation of Delaware Application October 20, 1947, Serial No. 780,930

14 Claims. (Cl. 255—1.6)

This invention relates to new and useful improvements in apparatus for orienting tools in well bores.

In directional drilling and side-tracking operations, it is necessary that deflecting tools, such as whipstocks, knuckle joints and other devices be oriented within the well bore so that the actual drilling may be carried out in a desired direction. There are several methods of properly orienting tools within well bores and one of such methods is disclosed in the prior patent issued to L. C. Miller, No. 2,327,658, dated August 24, 1943. The method and apparatus disclosed in such prior patent involves the use of magnetic elements which are mounted in the drill pipe in a known relation to the tool to be oriented, together with a recording instrument which is adapted to be lowered opposite and influenced by the magnetic elements in the drill pipe. The record obtained by the instrument provides information as to the position of the magnets and, therefore, the position of the tool to be oriented.

The present invention is primarily an improvement on the apparatus illustrated in the Miller patent above referred to. The particular instrument disclosed in the prior Miller patent requires the use of a timing mechanism which is preset at the surface before the instrument is lowered. Theoretically, sufficient time is allowed for the lowering operation but in many instances the watch mechanism actuates the instrument either prior or subsequent to the time that the instrument is in proper position within the drill pipe and this is a decided disadvantage.

It is one object of the present invention to provide an improved orienting apparatus for well tools, wherein the recording instrument is controlled in its actuation by means which cannot operate until the instrument reaches the proper position within the drill pipe, thereby assuring that the instrument record is made at the proper time.

An important object of the invention is to provide an improved orienting apparatus wherein magnetic elements in the drill pipe bearing a known relationship to the tool to be oriented control the position of a record member or disk and also wherein a second magnetic element in the drill pipe is arranged to control the actual operation of the recording instrument; the magnetic elements being so located within the drill pipe that said elements co-act with the instrument only when said instrument is in its proper predetermined position within said drill pipe.

Another object of the invention is to provide an improved orienting apparatus of the character described, wherein the recording instrument is electrically actuated and is provided with a magnetic switch which when closed actuates the instrument to make its record; said magnetic switch being controlled in its operation by a suitable magnetic element which is mounted in the drill pipe and which is so located that it co-acts with the switch to operate the same only when the instrument reaches its final desired position in said pipe.

A still further object of the invention is to provide an improved orienting apparatus of the character described wherein the use of a watch or other timing mechanism is entirely eliminated and also wherein the instrument is automatically actuated upon reaching a proper position within the drill pipe.

Still another object of the invention is to provide an improved electrical circuit closing mechanism including a magnetic switch which is arranged to be moved into a final position within a magnetic field, whereby when said switch occupies said final position the switch is actuated to automatically close an electrical circuit.

The construction designed to carry out the invention will be hereinafter described together with other features of the invention.

Figure 2:
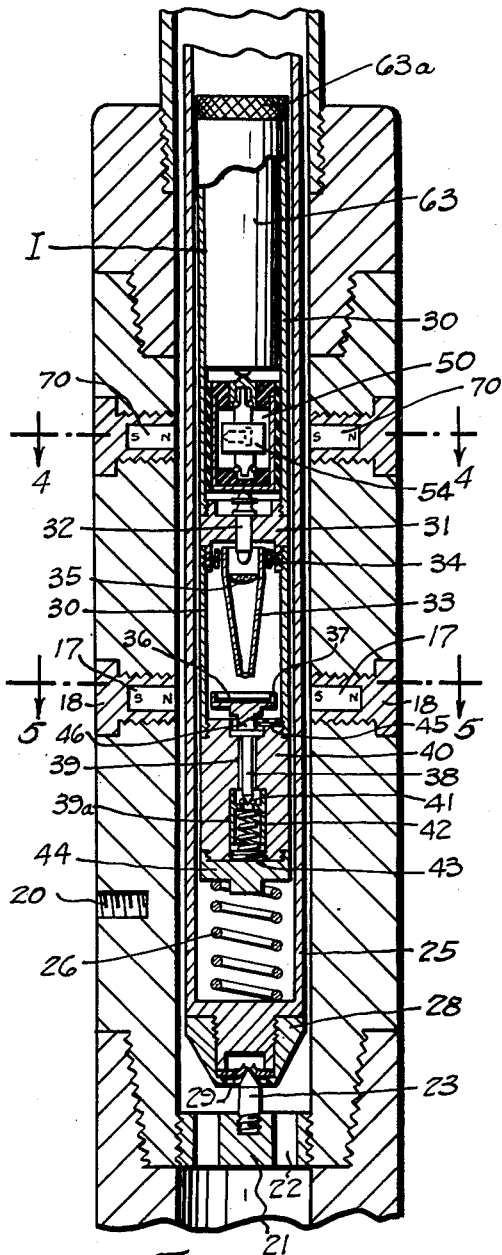
Figure 3:
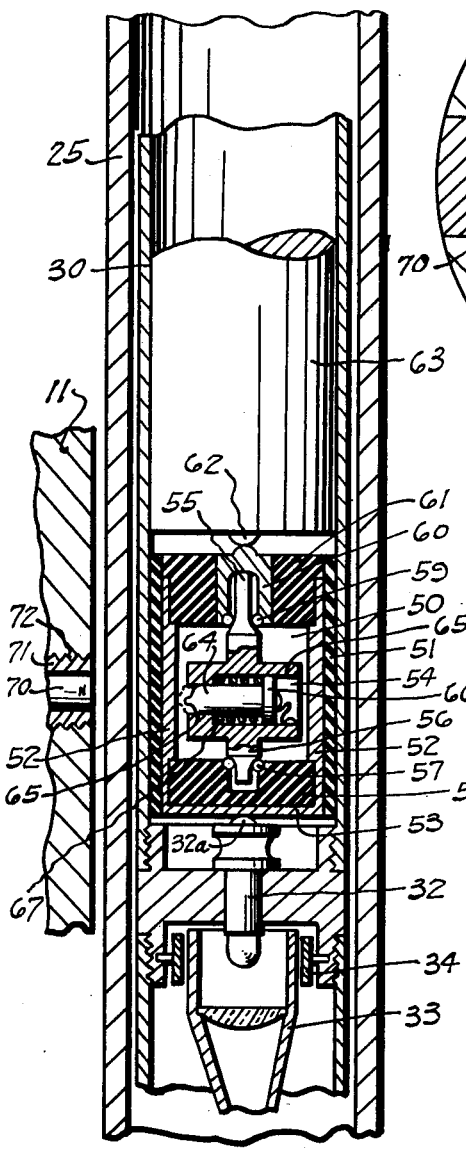
Figure 4:
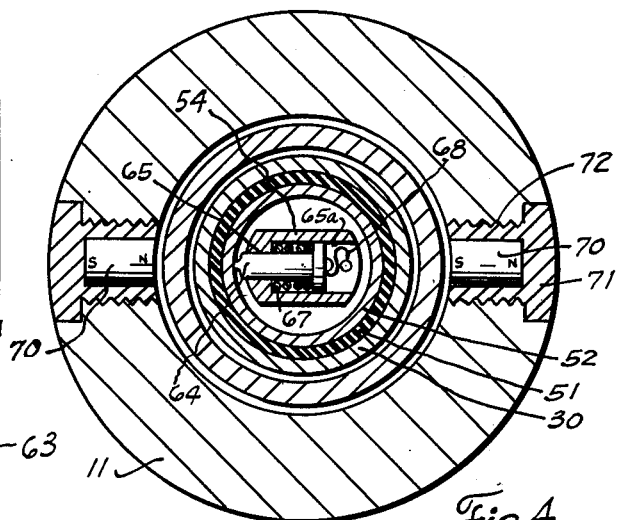
Figure 5:
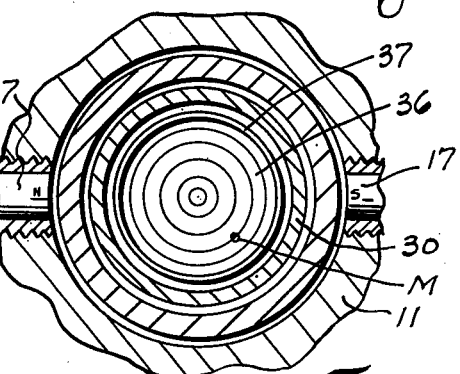
Figure 6:
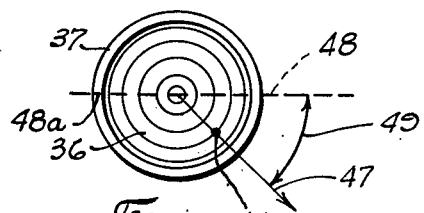

The invention will be more readily understood from a reading of the following specification and by reference to the accompanying drawing, wherein an example of the invention is shown, and wherein:

Figure 1 is a view partly in elevation and partly in section illustrating a drill pipe having a whipstock secured thereto and showing the improved orienting apparatus, constructed in accordance with the invention, in position within the drill pipe, Figure 2 is an enlarged, transverse, sectional view of the orienting apparatus and its co-acting sub which is connected to the lower end of the drill pipe, Figure 3 is an enlarged, transverse, vertical, sectional view illustrating the magnetic switch arrangements of the recording instrument, Figure 4 is an enlarged, horizontal, cross-sectional view taken on the line 4—4 of Figure 2, Figure 5 is an enlarged, horizontal, cross-sectional view taken on the line 5—5 of Figure 2, and Figure 6 is a plan view of the record which is obtained by the recording instrument.

In the drawings, the numeral 10 designates the usual drill pipe or stem which has an elongate cylindrical sub 11, preferably constructed of a non-magnetic material connected to its lower end by a suitable coupling 12. A drill bit 13 is secured to the lower end of the sub 11 by means of screw threads and said bit may be of any suitable type, a drag bit being illustrated. With this arrangement, it will be obvious that the sub 11 is interposed between the lower end of the drill stem or pipe 10 and the bit 13.

A whipstock 14, or other tool to be oriented is provided with a collar 15 which is made integral with its upper end. This collar surrounds the drill bit 13 and is secured thereto by means of a shear pin 16. It is noted that the shear pin is preferably located in the same vertical plane as the angular face 14a of the whipstock and it will be apparent that when the drill pipe is lowered through the well bore A, the whipstock as well as the bit are lowered therewith. A rotation of the drill pipe will impart a rotation to the whipstock so that said whipstock may be oriented in the hole to locate its inclined guide face 14a in a desired direction. When the whipstock engages the lower end of the drill bore or a cement plug B therein, the weight of the drill pipe 10 may be imposed upon the shear pin 16 to fracture said pin and disconnect the bit 13 from the whipstock collar, whereby the bit, sub 11 and drill pipe may move downwardly through said collar. Subsequent rotation of the pipe and drill bit 13 results in the bit being guided along the angular face 14a of the whipstock so that said bit drills downwardly in a direction in accordance with the setting of the whipstock.

As has been stated, the sub 11 is preferably constructed of a non-magnetic material and a pair of magnetic elements or bars 17 are mounted in the wall of the sub 11, said elements being preferably constructed of a magnetic material having a high coercive force, such as one of the aluminum-nickel-cobalt alloys. As is clearly shown in Figures 1 and 2 the magnets are disposed diametrically opposite each other within the sub and each magnet is axially mounted within a flanged sleeve member 18 which is threaded into a radial opening 19 provided in the sub. Each member 18 is preferably constructed of a non-magnetic material and has the magnet 17 pressed or otherwise mounted therein. This arrangement mounts the magnets in proper position within the sub and yet permits removal of the magnets for replacement by merely unscrewing the member from its opening. By observing Figure 2 it will be seen that the inner end of each magnet is exposed within the bore 11a of the sub 11.

As illustrated in the drawing, the shear pin 16 which secures the whipstock to the drill bit is located in the same vertical plane as one of the magnetic elements 17. In making up the threaded connection between the drill bit and the sub, the shear pin 16 may become misaligned in a vertical plane with the magnetic elements and in such instance the number of degrees of such misalignment is recorded whereby the operator may know at all times the relative position of the shear pin with respect to the magnetic elements 17. Since the shear 16 is disposed in the same vertical plane as the angular guide face 14a of the whipstock, the operator is thus advised of the relative position of the guide face 14a of said whipstock with respect to the magnetic elements 17 of the sub. If desired, a radially disposed threaded recess 20 may be formed in the body of the sub below one of the magnetic elements 17 and this opening may receive the shear pin 16, in which event the whipstock would be secured directly to the sub 11 instead of to the drill bit 13. In such case, the angular face 14a of said whipstock would at all times be aligned in a vertical plane with the magentic elements 17.

The lower end of the bore 11a of the sub receives a spider member 21 which is made in the form of a block threaded into the lower end of said bore. The block has vertical fluid passages 22 extending therethrough and is formed with an upwardly extending marking pin 23 which may be threaded into the upper surface of the block.

After the whipstock has been connected to the bit and the sub interposed between said bit and the drill pipe 10, the assembly is lowered into the well bore A until the whipstock reaches the position at which it is to be set. Following the positioning of the whipstock, a recording instrument assembly R is adapted to be lowered by means of a wire line or cable 24 downwardly through the drill stem and into the bore of the sub. The assembly R includes a recording instrument I, which will be hereinafter described, which instrument is mounted within an outer barrel 25. Shock absorbing springs 26 are disposed between the upper and lower ends of the instrument I and the ends of the barrel 25 and function to protect the instrument against undue shock during its movement through the drill pipe. The upper end of the barrel 25 is connected with a suitable sinker bar 27 which in turn has connection with the lowering line 24. The lower end of the barrel 25 has a collar 28 threaded thereon and this collar confines a soft lead disk 29 against the lower end of the barrel.

When the assembly R is lowered through the drill stem and into the bore 11a of the sub 11, the lead disk 29 is adapted to engage and be punctured by the pointed upper end of the axial pin 23 within the lower end of the bore 11a. The pin 23 not only functions to stop the barrel and the instrument I contained therein in a proper position within the sub, as will be explained, but also in puncturing the disk 29 provides an indication, after removal of the instrument assembly, that said assembly was properly located within the sub.

The instrument I which is clearly shown in Figures 2 and 3 includes an elongate outer shell or casing 30 which has a lamp section 31 connected intermedaite its ends. A suitable electric lamp 32 is mounted axially within the section 31. An elongate tubular plumb bob 35 is mounted within the housing immediately below the lamp 32. The upper end of the tubular plumb bob is mounted by means of a Cardan suspension 34 so that the lower end of said tube may undergo a universal movement within the casing or shell 30 of the instrument. The plumb bob has suitable lenses 35 for focusing the light rays from the lamp 32 which are emitted from the lower reduced end of the plumb bob.

The light rays emitting from the lower end of the plumb bob are directed onto the upper end of a circular record element 36 which is mounted on the upper surface of a rotatable carrier or disk 37. The carrier or disk 37 is constructed of a suitable metal which is capable of being magnetized and when the instrument assembly is within the bore 11a of the sub 11, the carrier or disk 37 is disposed in the same horizontal plane as the magnetic elements 17, whereby the disk or carrier is rotated into a stationary position by said magnetic elements. The carrier 37 has a depending stem 38 which extends downwardly through the bore 39 of a block 40, the latter being threaded into the lower end of the shell or casing 30 of the instrument. The lower end of the stem 38 is suitably mounted on bearings 41 which are supported by a spring mounted bearing holder 42 which is located in the counterbore 39a of the block 40. A block 43 closes the lower end of the outer bore and a cap member 44 is threaded onto the lower end of the block and has the shock absorbing spring 26 engaged therewith. Upward displacement of the carrier and its stem 38 is limited by a retaining screw 45 which is mounted in the block and which has its inner and disposed within an annular groove 46 formed immediately below the carrier disk at the upper end of the stem 38.

It will be evident that the magnetic disk or carrier 37 is mounted to freely rotate within the lower portion of the instrument casing below the elongate tubular plumb bob 33. The disk or carrier 37, together with the record 36 is rotated to a predetermined position by the magnets 17. Therefore, whenever the disk and its element are positioned opposite the magnetic element 17, the record element will always assume the same relative position therein due to the influence of the magnetic elements 17 on the magnetized material of the carrier 37.

The circular record element 36 is preferably constructed of a photographic printing out proof paper and the center of this record element represents the true vertical plane. When the elongate tubular plumb bob 33 and the instrument I are disposed in a true vertical plane, the light from the lamp 32 is directed exactly onto the center of the element 36. When the instrument I is inclined from the vertical, the plumb bob because of its universal mounting will remain in a vertical plane and this will cause the lower end of the plumb bob to move off center of the record element. The light rays from the lamp 32 will thus be directed onto the element 36 at a point off center of the element to produce a mark M such as shown in Figure 6. When the well bore is at an inclination from the vertical, the sub 11, as well as the instrument I will be inclined therewith and the plumb bob will naturally fall toward the low side of the well bore. Therefore, by drawing a line through the center of the record element 36 and the mark M, the direction of the low side of the well bore is indicated, as shown by the arrow 47 in Figure 6. Assuming the lines of magnetic force in the magnetized carrier or disk 37 to be in the plane of the dotted line 48 in Figure 6, the angle indicated at 49 in this figure will be the angular difference between the low side of the hole and the position of the magnetic elements 17. Since said magnetic elements are mounted in the same vertical plane or in a known relation to the whipstock face 14a, the determination of the angle 49 will give information regarding the direction of said whipstock face.

For controlling the operation of the instrument I, that is for controlling the illumination of the lamp 32, a magnetic switch 50 is mounted within the instrument casing 30 immediately above the lamp 32. This switch is illustrated in detail in Figure 3 and includes an outer tube or housing 51 of insulated material. A tubular contact sleeve 52 is mounted within the insulated housing and has a bottom 53 which is adapted to engage the contact 32a of the lamp 32 so as to make electrical connection therewith. A rotatable body 54 constructed of electrical conducting material is provided with an upstanding pivot stem 55 and a depending pivot stud 56. The stud 56 is rotatably confined within bearings 57 which are supported in an insulating plug 58 mounted within the lower end of the contact sleeve 52. The pivot stem is also rotatable within bearings 59 mounted within a magnetic contact collar 60 which is disposed within an insulating collar 61, the latter being located within the upper end of the contact sleeve 52. The magnetic collar 60 is arranged to be engaged by the contact 62 of a suitable battery 63 which is housed in the upper end of the instrument shell or casing 30. A suitable cap member or closure 63a which threads into the upper end of the instrument shell or casing confines the battery therein.

The body or rotor 54 is freely rotatable within the switch assembly unit and has a contact plunger 64 mounted within a diametrically extending bore 65. The bore 65 is counter-bored at 65a and the plunger has an external flange 66 which has a sliding fit within said counter bore. A coil spring 67 normally holds the plunger in a retracted position and a suitable connecting wire 68 electrically connects the plunger 64 with the magnetic surface of the body or rotor 54.

When the instrument assembly R has been lowered into proper position within the sub 11, the carrier 37 and the record element 36 are disposed in a horizontal plane in alignment with the magnetic elements 17. At the same time, the plunger 64 of the magnetic switch is located in the same horizontal plane with upper magnetic elements 70 which are also mounted in the sub 11 in a position spaced above the element 17. Each magnet 70 is mounted within a suitable sleeve member 71 which is threaded into a radial opening 72 provided for the purpose in the sub. The plunger 64 is constructed of a magnetic material so that when said plunger moves into the same horizontal plane as the magnets 70, the rotor 54 is rotated and the plunger is moved outwardly to the position shown in dotted lines in Figure 3, such movement being against the tension of the spring 67. The outward movement of the plunger will cause said plunger to engage the contact sleeve 52 which as explained has its bottom 53 engaging the tubular lamp 32. Thus, an electrical circuit from the battery 63, through the rotor 54, plunger 64 and contact sleeve 52 is closed to the lamp 32 to illuminate the same. Illumination of the lamp causes the projection of light rays onto the record element 36 to form the mark M thereon, whereby the low side of the well bore is indicated on said record element. As has been pointed out this indication is made with the disk 37 and the record element being held in a predetermined position by the magnets 17, which magnets are in known relation to the whipstock face 14a. From the record so obtained, it is possible to determine the actual position or direction of the face of the whipstock.

It is believed that the operation of the apparatus is evident from the foregoing. The whipstock is attached to the drill bit with the sub 11 interposed between the drill pipe and said bit and this assembly is lowered within the well bore A to the position at which the whipstock is to be set. The magnets 17 are in alignment with or in a known relationship to the guide face 14a of the whipstock. The recording instrument assembly R is then lowered into position within the sub and during such lowering, the plunger 65 of the magnetic switch assembly is in a retracted position so that the circuit to the electric lamp 32 is open.

When the instrument I reaches its final position within the bore 11a of the sub, the disk or carrier 37 is immediately rotated to a predetermined position by the lower set of magnets 17. The plumb bob 33 will, of course, swing off center of the record element to move into a position indicating the low side of the well bore A. At the same time, the upper set of magnets 70 will act upon the magnetic plunger 64 of the magnetic switch 50 to cause said plunger to close the electrical circuit from the battery to the lamp 32. Closing of this circuit will illuminate the lamp and as soon as the plumb bob comes to rest, a brilliant beam of light will be directed onto the record element 36 to expose a portion of the printing out proof paper of which this element is constructed and thereby form the mark M on the disk. The recording instrument assembly R is then removed and brought to the surface, after which the supporting block 40 and the recording element 36 are removed from the instrument I. By means of the reading device described in the Miller Patent 2,327,658 or the Miller Patent 2,327,659, the angle 49 between the mark M and the plane of the lines of magnetic force of the carrier 37 may be determined. If desired, a small index mark 48a may be provided on the carrier to indicate the plane of the magnetic lines of force, in which event a reading instrument would not be necessary. The reading instrument in the prior Miller patents provides means for simulating the position of the disk in the sub at the time that the record was made.

The direction of inclination of the well bore is known since a previous directional survey has indicated the same to the operator. Thus, the actual compass position of the low side of the hole is known and, therefore, the azimuthal or compass position of the magnets 17 may be easily determined. Since the magnets 17 are in a known relation to the whipstock face, determination of the position of the magnets provides information as to the position of the face 14a of said whipstock.

From the foregoing it will be evident that the recording instrument does not depend upon a switch or other setting mechanism for controlling its operation. The magnetic switch prevents closing of the circuit to the lamp to make the recording until the instrument is in a proper position within the sub 11. It is only while the instrument is in position that the magnetic switch is actuated by the upper magnets 70 to illuminate the lamp. As soon as the record is made and the instrument is lifted upwardly during removal, the magnetic switch moves out of the influence of the magnets 70 and re-opens the circuit. Thus, during lowering and raising of the assembly R, there is no possibility of a record being made which might be possible if a timing mechanism is depended upon to operate said instrument. It is noted that the diametrically opposed magnets 70 and 17 are properly polarized but, if desired, only a single magnet 70 and a single magnet 17 may be employed. It is also noted that the particular switch mechanism has been described as used with a tool orienting device. However, the particular switch mechanism could be used for other purposes and in other apparatus which may require the closing of an electrical circuit upon the reaching of a final position by an instrument or other device.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. An orienting apparatus for well tools including, a hollow drill pipe, a tool carried by said drill pipe and disposed in a predetermined position in a vertical plane relative thereto, magnetic means mounted in a drill pipe in a predetermined horizontal plane, a second magnetic means mounted in the drill pipe above the first magnetic means, an instrument adapted to occupy a final longitudinal position in the drill pipe and having a rotatable record element which is magnetized so as to be subject to magnetic influence, means for recording the angular position of the low side of the well bore on said element, and magnetic actuating means for controlling operation of the recording means, movement of the instrument into its final longitudinal position within the drill pipe moving the magnetized rotatable element into the field of influence of the first magnetic means in the drill pipe and also moving the magnetic actuating means into the field of influence of the second magnetic means in said pipe, whereby the rotatable record element assumes a predetermined position with respect to the drill pipe and the magnetic actuating means is operated to actuate the recording means to thereby record the position of the low side of the well bore relative to the drill pipe and tool carried thereby.

2. An orienting apparatus as set forth in claim 1, wherein the recording means of the instrument is electrically operated and also wherein the magnetic actuating means is a magnetic switch which is operated to close the electrical circuit to the recording means when moved into the influence of the second magnetic means mounted in the drill pipe.

3. An orienting apparatus as set forth in claim 1, wherein the magnetic means mounted in the drill pipe comprise a permanent type magnet.

4. The combination with a drill pipe having magnetic means mounted therein and having a second magnetic means mounted in spaced relation above the first means, of a recording instrument adapted to be lowered into the drill pipe and including, a record element carrier which is magnetized so as to be subject to magnetic influence, a record element mounted in the carrier, means for recording the angular position of the low side of the well bore on said record element, and magnetic actuating means in said instrument for controlling operation of the recording means, the spacing between the magnetized carrier and the magnetic actuating means being substantially the same as the spacing between the two magnetic means in the drill pipe whereby the instrument may be lowered into said pipe to a position with the carrier opposite the first magnetic means and the magnetic actuating means in the instrument opposite the second magnetic means in the drill pipe so that the carrier is moved into a predetermined position with respect to the drill pipe and the actuating means is operated to actuate the recording means.

5. The combination as set forth in claim 4, wherein the magnetic means which are mounted within the drill pipe are bar magnets of the permanent type.

6. The combination as set forth in claim 4, wherein the recording means of the instrument is electrically operated and also wherein the magnetic actuating means is a magnetic switch which is operated to close the electrical circuit to said recording means when said switch moves into the influence of the magnetic means in the drill pipe.

7. The combination with a drill pipe having a magnetic means mounted therein, of an instrument which includes a record element, recording means for recording the deviation of the well bore on said element, and magnetic actuating means for controlling the operation of the recording means, whereby when the instrument is lowered through the drill to a position with the magnetic actuating means of said instrument opposite the magnetic means in said drill pipe, said actuating means is operated to actuate the recording means.

8. The combination as set forth in claim 7, wherein the recording means of the instrument is electrically operated and also wherein the magnetic actuating means is a magnetic switch connected in the electrical circuit of said recording means, whereby closing of said switch by the magnetic influence of the magnetic means in the drill pipe operates said recording means.

9. The combination as set forth in claim 7, wherein the record element is a disk of printing out proof paper and wherein the recording means comprises a light source and a tubular plumb with the latter overhanging said disk and functioning to direct the light rays from said light source onto the disk in accordance with the position of the plumb bob with respect to the disk.

10. In combination, a hollow drill pipe, a tool carried by the drill pipe and disposed in a predetermined position in a vertical plane relative thereto, an instrument arranged to be lowered through the drill pipe and adapted to occupy a predetermined final longitudinal position therein, said instrument containing a rotatable indicating element and means for recording the angular position of the low side of the hole on said element, together with magnetic switch means for controlling the operation of said recording means, the rotatable element being magnetized so as to be subject to magnetic influence, magnetic means mounted in the drill stem and disposed opposite the rotatable element when the instrument is in position in the pipe, whereby the element is rotated to a predetermined position relative to the pipe so that the indication of the angular position of the low side of the hole is recorded relative to the drill pipe and tool carried thereby, and a second magnetic means mounted in the drill pipe and disposed opposite the magnetic switch means of the instrument for actuating the switch means to operate the record when said instrument is in position within the drill pipe.

11. A well surveying instrument including, a casing, a record member mounted in said casing, recording means within the casing above said member for recording the deviation of said casing from the vertical by forming an index on said member, magnetic means actuated when subjected to the influence of a magnetic field for operating said recording means, and means positionable in the well separate from the instrument for establishing a magnetic field which will actuate the magnetic means when the instrument is placed in desired operative position in the well.

12. A well surveying instrument including, a casing, a record member mounted in said casing, electrically operated recording means within the casing above said member for recording the deviation of the casing from the vertical by forming an index on said member, a magnetic switch connected in the electrical circuit of the recording means for controlling the operation thereof and adapted to be operated when subjected to the influence of an exterior magnetic field, and means establishing the magnetic field in the well prior to positioning the instrument therein.

13. An electrical circuit closing mechanism for a well survey instrument comprising a switch having a circuit closing plunger, means for normally maintaining the plunger in switch open position, and magnetic means so carried by well drill pipe that when the survey instrument is placed in the drill pipe in desired operative position magnetic lines of force will be effective to cause the plunger to be moved to switch closed position.

14. In well surveying means, a well survey instrument for positioning in a drill pipe to obtain recorded data, means for actuating the instrument to obtain the data including a member operable under the influence of a magnetic field, and means so carried by the drill pipe as to establish the magnetic field causing the instrument to be actuated when it assumes desired operative position in the drill stem.

CHARLES A. BROKAW.
WILLIAM G. JAMES.

REFERENCES CITED

The following references are of record in the file of this patent:

UNITED STATES PATENTS

| Number | Name | Date |
| --- | --- | --- |
| 2,203,730 | Johnson | June 11, 1940 |
| 2,323,910 | Hubbell | July 13, 1943 |
| 2,327,658 | Miller | Aug. 24, 1943 |
| 2,410,746 | Raettig | Nov. 5, 1946 |